United States Patent
Råmark et al.

(10) Patent No.: US 12,297,297 B2
(45) Date of Patent: May 13, 2025

(54) PROCESS FOR PRODUCING MICROCRYSTALLINE CELLULOSE

(71) Applicant: ANDRITZ OY, Helsinki (FI)

(72) Inventors: Hannu Råmark, Kotka (FI); Kari Vanhatalo, Helsinki (FI); Kari Peltonen, Kotka (FI); Taina Lintunen, Kotka (FI)

(73) Assignee: Andritz Oy, Helsinki (FI)

( * ) Notice: Subject to any disclaimer, the term of this patent is extended or adjusted under 35 U.S.C. 154(b) by 956 days.

(21) Appl. No.: 16/967,602

(22) PCT Filed: Feb. 6, 2019

(86) PCT No.: PCT/FI2019/050090
§ 371 (c)(1),
(2) Date: Aug. 5, 2020

(87) PCT Pub. No.: WO2019/155123
PCT Pub. Date: Aug. 15, 2019

(65) Prior Publication Data
US 2021/0087299 A1    Mar. 25, 2021

(30) Foreign Application Priority Data
Feb. 7, 2018 (FI) .................... 20185110

(51) Int. Cl.
*C08B 15/02* (2006.01)
*D21C 9/00* (2006.01)
*D21H 11/20* (2006.01)

(52) U.S. Cl.
CPC .............. *C08B 15/02* (2013.01); *D21C 9/002* (2013.01); *D21H 11/20* (2013.01)

(58) Field of Classification Search
CPC ......... C08B 15/02; D21C 9/002; D21H 11/20
See application file for complete search history.

(56) References Cited

U.S. PATENT DOCUMENTS

| 4,923,981 A * | 5/1990 | Weibel .................. A23G 3/343 426/615 |
| 6,361,025 B1 | 3/2002 | Cincotta et al. |
| (Continued) |

FOREIGN PATENT DOCUMENTS

| CN | 104592400 | 5/2015 |
| CN | 104672468 | 6/2015 |
| (Continued) |

OTHER PUBLICATIONS

Manikavasagam Karthik, Closing water loop in a paper mill section for water conservation and reuse, Jan. 29, 2011, Elsevier (Year: 2011).*

(Continued)

*Primary Examiner* — Jacob T Minskey
*Assistant Examiner* — Stephen M Russell
(74) *Attorney, Agent, or Firm* — Nixon & Vanderhye P.C.

(57) ABSTRACT

A process for producing microcrystalline cellulose from fibrous cellulosic material by acid hydrolysis at an MCC plant. In this process a suspension of cellulosic pulp is thickened, so that filtrate is formed. A consistency of the thickened suspension is adjusted to 5-40% by adding dilution liquid, and the pH of the suspension is adjusted to a value of 4 or less with acid. The pulp suspension is subjected to acid hydrolysis of at least 120° C. in a reactor to produce a mixture of microcrystalline cellulose and hydrolysate. The mixture is discharged from the reactor to a lower pressure and lower temperature to flash the mixture and generate flash steam. Microcrystalline cellulose is separated from hydrolysate. The separated cellulose is washed in one or several washing apparatuses. The consistency of the microcrystalline cellulose is increased by thickening and/or drying for further processing.

17 Claims, 1 Drawing Sheet

(56) References Cited

U.S. PATENT DOCUMENTS

| | | | |
|---|---|---|---|
| 9,096,692 B2* | 8/2015 | Dahl | C08B 15/02 |
| 10,385,140 B2* | 8/2019 | Capanema | C08L 97/005 |
| 2003/0089465 A1 | 5/2003 | Schaible et al. | |
| 2004/0007615 A1* | 1/2004 | Nguyen | G07F 9/06 |
| | | | 232/15 |
| 2004/0074615 A1* | 4/2004 | Nguyen | C08B 1/00 |
| | | | 162/76 |
| 2014/0179912 A1 | 6/2014 | Rasanen et al. | |
| 2016/0184438 A1 | 6/2016 | Nelson et al. | |

FOREIGN PATENT DOCUMENTS

| | | | |
|---|---|---|---|
| WO | 2011/154600 | 12/2011 | |
| WO | 2011/154601 | 12/2011 | |
| WO | WO-2017134334 A1 * | 8/2017 | ............. C08B 15/02 |

OTHER PUBLICATIONS

International Search Report and Written Opinion of the ISA for PCT/FI2019/050090, mailed Apr. 11, 2019, 12 pages.
CN Office Action cited in CN Application No. 201980010447.8, mailed Mar. 9, 2022, 14 pages.
CN Office Action cited in CN Application No. 201980010447.8, mailed Nov. 29, 2022, 5 pages.

* cited by examiner

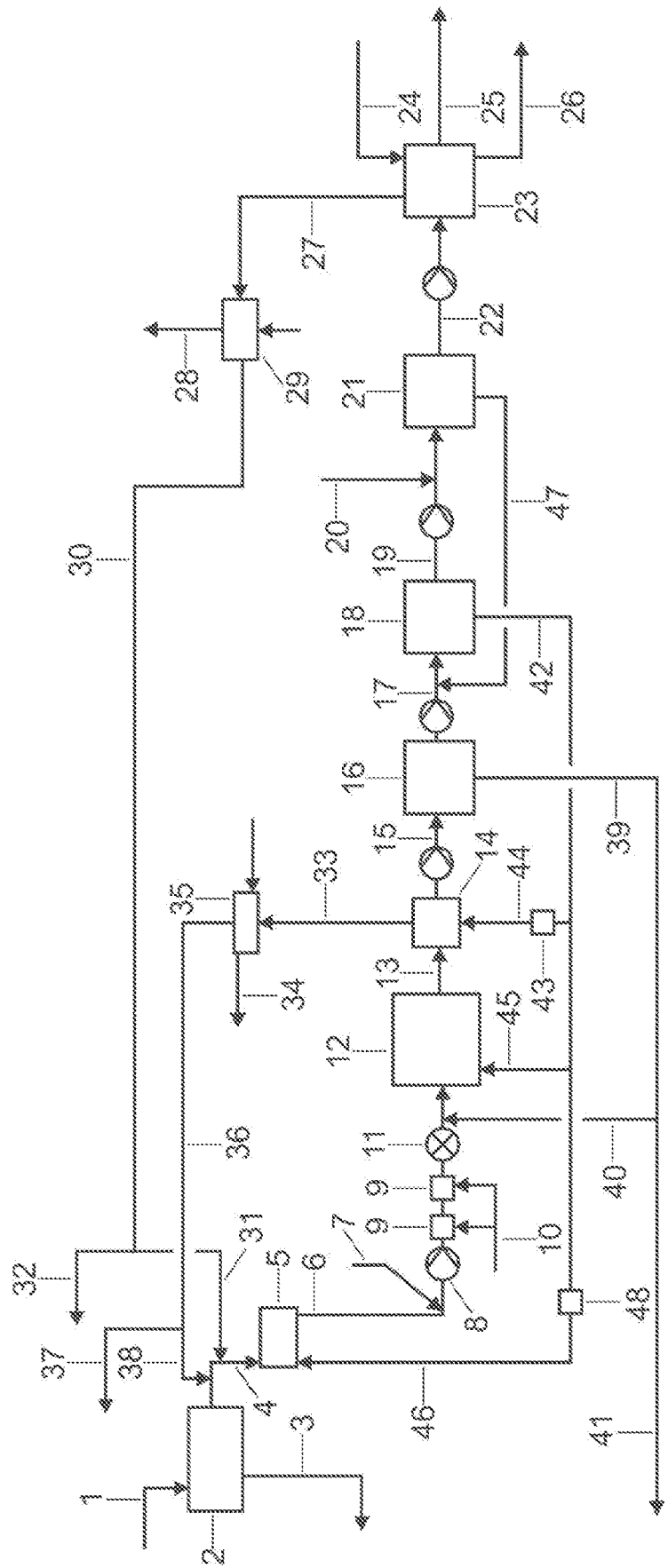

PROCESS FOR PRODUCING MICROCRYSTALLINE CELLULOSE

This application is the U.S. national phase of International Application PCT/FI2019/050090 filed Feb. 6, 2019, which designated the U.S. and claims priority to Finnish Patent Application 20185110 filed Feb. 7, 2018, the entire contents of each of which are hereby incorporated by reference.

FIELD OF THE INVENTION

The present invention relates to a process for producing microcrystalline cellulose (MCC). More specifically, the present invention relates to an overall process for producing MCC which can be further treated.

BACKGROUND OF THE INVENTION

Microcrystalline cellulose (MCC) is a versatile product in many industrial applications, including pharmaceuticals and food. It is used also e.g. in paints, oil drilling, cosmetic products. MCC does not have a substantial carbonyl content, e.g., less than 1% carbonyl. See Chemical Book, Microcrystalline Cellulose (downloaded Aug. 20, 2024) and European Union Commission Regulation 231/2012, pp. 82-83/177 (9 Mar. 2012).

Microcrystalline cellulose is a flour-form cellulose product that can be manufactured from all types of natural celluloses. It is typically manufactured by using acid hydrolysis of cellulose. WO 2011/154601 discloses a process, in which fibrous cellulosic material is subjected to acid hydrolysis for producing microcrystalline cellulose. The temperature is at least 140° C. and consistency at least 8% on dry weight of cellulose. The amount of acid is low, from 0.2 to 2% on dry weight of cellulose. WO2011/154600 discloses a process in which fibrous cellulosic material is hydrolyzed with an acid at an elevated temperature to produce microcrystalline cellulose. In this document the production is integrated to the production of a pulp mill such that at least part of the chemicals used in the acid hydrolysis is produced by an integrated chemical recovery process of the pulp mill.

In view of the known processes there is a need to develop an overall process for producing microcrystalline cellulose for use as a raw material or additive in different applications.

SUMMARY OF THE INVENTION

An MCC plant that produces MCC by acid hydrolysis at elevated pressure and temperature can be a process department at a chemical pulp mill. The MCC plant can be also a stand-alone plant.

A new process for producing microcrystalline cellulose from fibrous cellulosic material, such as chemical pulp, by acid hydrolysis is provided. According to this process, a) a suspension of cellulosic material is thickened, so that filtrate is formed, b) a consistency of the thickened suspension is adjusted to 5-40% by adding dilution liquid, and the pH of the suspension is adjusted to a value of 4 or less with acid, c) the temperature of the suspension is increased to a temperature of 120-200° C., d) the pulp suspension is subjected to acid hydrolysis at 120-200° C. in a reactor to produce a mixture of microcrystalline cellulose and hydrolysate, e) the mixture is discharged from the reactor to a lower pressure and lower temperature to flash the mixture and to generate flash steam, f) the mixture is treated so that microcrystalline cellulose is separated from hydrolysate, and the separated microcrystalline cellulose is washed in one or several washing apparatuses, and g) the consistency of the microcrystalline cellulose is increased by thickening for further processing or thickening and drying for further processing.

The fibrous cellulosic material may be derived from wood plant material, such as softwoods or hardwoods. A preferred fibrous cellulosic material is a bleached or unbleached chemical pulp, such as kraft pulp, soda-AQ pulp, sulfite pulp, neutral sulfite pulp, acid sulfite pulp or an organosolv pulp. The pulp may be a pulp obtained immediately after the digestion or a pulp that has been oxygen delignified after the digestion or a pulp that has been oxygen delignified and bleached. A preferred pulp is an oxygen delignified pulp and/or fully bleached pulp. Dissolving pulp is a good raw material, because its cellulose content is high. It is also possible to use fibrous cellulosic material obtained from non-wood lignocellulosic plant materials such as cotton, grass, bagasse, straws of grain crops, flax, hemp, sisal, abaca or bamboo. The fibrous cellulosic material, such as chemical pulp, preferably has a lignin content of below 40 kappa number, more preferably below 30 kappa number, and most preferably below 10 kappa number. An initial step of the new process, step a), is a pre-thickening stage. Thickening the feed pulp to a higher consistency facilitates various unavoidable dilutions (such as dilute sulfuric acid, condensate from direct steam heating, weak hydrolysate) required by the later steps of the process so that a desired consistency can be maintained in the hydrolysis stage. If the pre-thickening and subsequent dilution are not carried out, there is less use of filtrates formed in process stages after the hydrolysis and at least a part of these filtrates should be discharged as waste water. Typically, these filtrates are formed in washing stages of the MCC. According to the present invention, these filtrates can be used in the dilution after the thickening and they can be circulated in the process. The thickening can be done with a screw press, or with other known dewatering apparatus suitable for pulp suspension, e.g. a drum filter, a disc filter, a filter press, a belt press, a twin a wire press, a dewatering press, a wash press. Part or all of the filtrate from the pre-thickening stage can be recovered and led to the chemical pulp mill, if the MCC plant is integrated to the pulp mill, where the feed pulp is produced. The recovery of the filtrate improves the water economy of the MCC plant and the pulp mill. The filtrate can be used in pulp bleaching or brown stock area.

After the pre-thickening stage, the pulp consistency for the hydrolysis reactor is controlled by dilution. The dilution liquid may be weak hydrolysate from the washing of microcrystalline cellulose, condensate from the heat recovery systems of the MCC plant, strong hydrolysate separated from microcrystalline cellulose after the hydrolysis reactor, or process water. The weak hydrolysate is formed when microcrystalline cellulose is treated in a washer or washers and filtrate is separated from it. Flash steam is generated when the mixture from the hydrolysis reactor is discharged to a lower pressure and temperature, e.g. to a blow tube, and the flash steam is led to a condenser for recovering heat to hot water. Condensate is generated also if the microcrystalline cellulose is subjected to a drying, whereby steam is formed and heat is recovered in a dryer condenser to hot water. Process water may be hot water heated in a condenser of the MCC plant.

The dilution after the pre-thickening may be carried out e.g. at a screw conveyor when the pulp is transported from the pre-thickening stage towards the hydrolysis reactor. If needed, dilution liquids can be heated, e.g. with direct steam injection. The dilution screw drops the pulp to a stand pipe from which the pulp is pumped forward at a consistency of 5-40%, preferably 10-30%, typically with a medium consistency (MC) pump or a screw pump.

The pulp suspension is then pumped towards the hydrolysis reactor. The pulp is acidified by injecting acid into the pulp after or before a feed pump. The pulp temperature is raised with one or several direct steam injectors, e.g. a steam injector heater described in U.S. Pat. No. 6,361,025. Medium pressure steam from the pulp mill's boiler plant is typically used as a heat source in direct steam heating. In a stand-alone MCC plant steam is supplied from an external source.

Acid and steam are mixed evenly into the pulp suspension by using a mixer. The pulp pressure is increased with the feed pump and, if needed, also e.g. with a booster pump, to the reactor pressure, which typically is 3-14 bar(g) at the reactor top.

The acid may be organic acid or inorganic acid. Typically it is sulphuric acid. Sulphuric acid can be produced at the pulp mill. Non-chlorine containing acidic liquid flows, such as bleaching filtrates, from the pulp mill can also be used for the acidification of the pulp suspension. In the stand-alone MCC plant acid is supplied from external sources.

Hydrolysis takes place in a liquid phase in a reactor under acidic conditions (pH is 4.0 or below, preferably 2-3), and at an elevated temperature of 120-200° C., typically 120-185° C., preferably 150-170° C. During the residence time of 30 seconds-240 minutes, typically 5-240 minutes, preferably 10-60 minutes, in the reactor, a mixture of microcrystalline cellulose and hydrolysate is formed. In the hydrolysis amorphous cellulose structures and hemicelluloses are dissolved, and the cellulose fibers are converted to particles having an average size of about 10-200 µm.

The reactor is typically a vertical vessel, which may be an up-flow or a down-flow reactor.

The mixture of microcrystalline cellulose and hydrolysate is blown from the reactor to a lower pressure and temperature. The mixture is discharged typically into a blow tube in which it will flash to lower temperature and pressure. Generated flash steam is condensed in a condenser. Condensate can be used in dilutions or led to the chemical pulp mill and utilized there.

After the blowing the mixture is treated for separating hydrolysate from microcrystalline cellulose. Before the separation the mixture may be diluted, e.g. at the bottom of the blow tube, before it is pumped forward.

Dilution liquid may be weak hydrolysate from the washing department, condensate from a dryer condenser, or process water.

The dilution liquid can be cooled in a cooler in order to bring the mixture temperature down to a level suitable for the subsequent washing department. The mixture is pumped forward to a first washer at a suitable feed consistency, such as 3-10%. Separation of the hydrolysate from the microcrystalline cellulose is done in the first washing apparatus. The separation may also be carried out in a thickener before the first washing apparatus.

Washing of the hydrolysis product takes place in one or several washing apparatuses. The washing principle can be dilution—thickening or displacement washing depending on the apparatus type. The washer can be any apparatus type suitable for particle like material, e.g. a drum washer, a centrifuge, a disc filter, a drum filter, a filter press, a belt press, a twin wire press, a screw press, a wash press, or a belt washer.

The washing is carried out counter-currently. The cleanest washing liquid is fed to a last washing stage, and filtrate from each washing stage is led counter-currently to a previous washing stage in a direction of the MCC flow.

When the washing requires predilution for washer(s), this is done with filtrate of a subsequent washer, condensate from a dryer condenser, and/or process water. For the first washer predilution may take place at the blow tube. For subsequent washers predilution takes place at a repulper screw conveyor of the preceding washer. A repulper after the first washer drops the diluted end product into a stand pipe, from which the product is pumped to a subsequent washer typically at a consistency of 3 . . . 10%.

In displacement washing a washing liquid may also be filtrate of the subsequent washer, condensate from a dryer condenser, and/or process water.

Hydrolysate is separated from MCC in the first washer. The hydrolysate, which is rich in carbohydrates, is typically neutralized and can be used in the production of energy or bio-products. A portion of the hydrolysate can be recycled to the pulp suspension for the pH adjustment before hydrolysis. It may be recycled also to the hydrolysis reactor.

Filtrate or filtrates (weak hydrolysate) from subsequent washers may be used as washing liquids and/or dilution liquids in MCC washing or as dilution liquid after the pre-thickening stage. Weak hydrolysate may also be used in the pulp consistency control or in the pH adjustment before the hydrolysis reactor and/or in the reactor.

The final apparatus in the washing department operates as a washer or only as a thickener adjusting a consistency of the product to a suitable level depending on a subsequent dryer. It is beneficial for the drying energy consumption that the consistency of the product is high before drying, preferably 40% or over, typically 40-50%. Optionally, after the thickening the MCC can be led directly to a further processing or use, if no drying is needed, or if a consistency of 40-50% is preferred for the next process stage.

Further processing or use comprises industrial applications, such as pharmaceutical, food, cosmetics, paper and board applications, and the production of derivatives of microcrystalline cellulose, such as nanocellulose and CMC.

The next step in the process may be drying, if the MCC has to be dried to a high dry content before further processing or use. The dryer type can be: a paddle dryer, a flash dryer, a fluid bed dryer, a belt dryer, a drum dryer, a helix dryer, a plate dryer, a spray dryer. The dryer utilizes power systems, e.g. steam, electricity, of the chemical pulp mill, typically low- or medium pressure steam. As the product progresses through the dryer, its moisture is evaporated and vented to a condenser. Condensates may be utilized in the MCC production line or led to the chemical pulp mill. At the stand-alone MCC plant the dryer utilizes power systems, e.g. steam, electricity, of external utility suppliers.

Dry product typically at a consistency over 93% is led from the dryer(s) to a subsequent product treatment, e.g. packaging step.

Acid liquid flows from the MCC production which are not needed in the MCC plant can be led to the pulp mill. These flows comprise hydrolysate, and filtrates from pre-thickening, washing and/or thickening. Acid liquid can be used in a prehydrolysis kraft pulp production, in an acid stage of pulp bleaching and/or in an acidulation stage at a tall oil plant. Condensates from flashing or drying can also be used at the pulp mill.

BRIEF DESCRIPTION OF THE DRAWING

To enable a better understanding of the present invention, and to show how the same may be carried out into effect, reference will now be made, by way of example only, to the accompanying drawing, in which:

FIG. 1 is a schematic view illustrating an exemplary system for practicing a process according to the invention.

DETAILED DESCRIPTION

FIG. 1 shows an exemplary system of an MCC plant that may be used according to the present invention. In this embodiment the MCC plant is integrated to a chemical pulp mill. The new process can be practiced also at a standalone MCC plant.

In an initial stage of the new process fibrous cellulosic material is fed to a pre-thickening stage 2 through line 1. The material may be derived from wood plant material, such as softwoods or hardwoods. A preferred fibrous cellulosic material is a bleached or unbleached chemical pulp, such as kraft pulp, or dissolving pulp.

The thickening can be done with a screw press, or with other known dewatering apparatus suitable for pulp suspension, e.g. a drum filter, a disc filter, a filter press, a belt press, a twin wire press, a dewatering press, a wash press. Part or all of the filtrate from the thickening stage can be recovered and led through line 3 to the chemical pulp mill, if the MCC plant is integrated to the pulp mill. The filtrate can be used in pulp bleaching or brown stock area.

After the thickening stage 2, the pulp consistency for acid hydrolysis is controlled by dilution. The pulp is led through line 4 where dilution liquid is added into the pulp which is further directed to a dilution screw 5. The dilution liquid may comprise condensates from the heat recovery system of the MCC plant. The dilution may be carried out e.g. at a screw conveyor when the pulp is transported from the pre-thickening stage towards a hydrolysis reactor. The dilution screw drops the pulp to a stand pipe 6 from which the pulp is pumped forward at a consistency of 5-40%, preferably 10-30%, with a pump 8, such as a medium consistency (MC) pump or a screw pump.

The pulp suspension is then pumped towards the hydrolysis reactor 12. The pulp is acidified by injecting acid 7 into the pulp after or before a feed pump 8. The pulp temperature is raised with one or several direct steam injectors 9, e.g. a steam injector heater described in U.S. Pat. No. 6,361,025. The steam is typically medium pressure steam 10. Acid and steam are mixed evenly into the pulp suspension by using a mixer 11. The pulp pressure is increased with the feed pump 8 and, if needed, also e.g. with a booster pump, to the reactor pressure, which typically is 3-12 bar(g) at the reactor top.

The acid may be organic acid or inorganic acid. Typically it is sulphuric acid. Sulphuric acid can be produced at the pulp mill. Acidic liquid flows, such as bleaching filtrates, from the pulp mill can also be used for the acidification of the pulp suspension.

Hydrolysis takes place in the reactor 12 under acidic conditions (pH is 4.0 or below, preferably 2-3), and at an elevated temperature (120-200° C., typically 120-185° C., preferably 150-170° C.). During the residence time of 5-240 minutes, typically 10-60 minutes, in the reactor 12, a mixture of microcrystalline cellulose and hydrolysate is formed.

The reactor 12 is typically a vertical vessel, which may be an up-flow or down-flow reactor.

The mixture of microcrystalline cellulose and hydrolysate is blown from the reactor 12 to a lower pressure and temperature. The mixture is typically discharged through line 13 into a blow tube 14 in which it will flash to lower temperature and pressure. Generated flash steam 33 is condensed in a condenser 35 to produce hot water 34. Condensate can be led through lines 36 and 38 to pulp dilutions in line 4 or led to the chemical pulp mill through line 37 and utilized there.

After the blowing the mixture is treated for separating hydrolysate from microcrystalline cellulose. The mixture is first diluted, e.g. at the bottom of the blow tube 14, before it is pumped forward.

Dilution liquid may be weak hydrolysate 44 from the washing department, condensate from a dryer condenser, or process water.

The dilution liquid can be cooled in a cooler 43 in order to bring the mixture temperature down to a level suitable for the subsequent washing department. The mixture is pumped through line 15 forward to a first washer 16 at a suitable feed consistency, such as 3-10%. Using a process pump is possible because the hydrolyzed product is easily fluidized and suspended, even at medium consistency.

Washing of the hydrolysis product takes place in one or several washing apparatuses. The washing principle can be dilution-thickening or displacement washing. In this embodiment a dilution-thickening method is used. The washers 16 and 18 may be drum washers, wherein the hydrolysis product flows from washer 16 via line 17 to washer 18.

The washing is carried out counter-currently. The cleanest washing liquid, such as hot water, is fed from line 20 into line 19 and flows to a last washing or thickening stage 21, and filtrates 47 and 42 from washing/thickening stages 21 and 18 are led counter-currently to the previous washing stage in a direction of the MCC flow.

The washer apparatus thickens the product to a consistency of 25 . . . 30% and discharges it into a subsequent repulper screw conveyor washer or to a drying department.

When the washing requires predilution for washer(s), this is done with filtrate of the subsequent washer, condensate from a dryer condenser, and/or process water. For the first washer predilution may take place at the blow tube. For subsequent washers predilution takes place at the repulper screw conveyor of the preceding washer. The repulper after the first washer drops the diluted end product into a stand pipe, from which the product is pumped to a subsequent washer typically at a consistency of 3-10%.

In displacement washing a washing liquid may also be filtrate of the subsequent washer, condensate from a dryer condenser, and/or process water.

Hydrolysate is separated from MCC in the first washer 16. The hydrolysate, which is rich in carbohydrates, can be used in the production of energy at the pulp mill where it is led through line 39, 41. A portion of the hydrolysate can be recycled through line 40 into the pulp suspension for the pH adjustment before hydrolysis in the reactor 12. It may be recycled also directly to the hydrolysis reactor.

Filtrate (weak hydrolysate) from the second washer 18 may be used as dilution liquid in the screw conveyor 5 where it is led through line 46. The filtrate may be heated in a direct steam heater 48. Filtrate from the second washer may be added also to the hydrolysis reactor 12 through line 45.

The final apparatus 21 in the washing department operates as a washer or only as a thickener adjusting a dry consistency of the MCC product to a suitable level depending on a subsequent dryer. It is beneficial for the drying energy consumption that the consistency of the product is high before drying, preferably 40% or over, typically 40-50%.

The next step in the process is drying the MCC flowing from line 22, if the MCC has to be dried to a high dry content before further processing or use. The dryer type can be: a paddle dryer, a flash dryer, a fluid bed dryer, a belt dryer, a drum dryer, a helix dryer, a plate dryer, a spray dryer. The dryer 23 utilizes power systems, e.g. steam, electricity, of the chemical pulp mill, typically, low or medium pressure steam 24. This steam is condensed in the dryer 23, and condensate 26 can be returned to the boiler plant and used as boiler water. As the product progresses through the dryer, its moisture is evaporated and vented through line 27 to a condenser 29, where hot water 28 is generated. Condensate in line 30, 31 is utilized in pulp dilution in line 4 or led through line 32 to the chemical pulp mill. Dry product typically at a consistency over 93% is led from the dryer 23 through 25 to a subsequent product treatment, e.g. a packaging step.

Optionally, after the thickening the MCC at a consistency of 40-50% can be led directly to a further processing or use, if no drying is needed.

The invention claimed is:

1. A method for producing microcrystalline cellulose from fibrous cellulosic material by acid hydrolysis at a microcrystalline cellulose (MCC) plant, the method comprising:
   a) thickening a suspension of cellulosic material by removing a first filtrate from the cellulosic material,
   b) adding a dilution liquid to the thickened suspension of cellulosic material to adjust a consistency of the thickened suspension to a range of five to forty percent, and adding an acid to the thickened suspension to adjust a pH to no more than four of the thicken suspension,
   c) increasing a temperature of the thickened suspension with the dilution liquid to a range of 120° C. to 200° C.,
   d) subjecting the thickened suspension with the dilution liquid to acid hydrolysis in a reactor while the thickened suspension with the dilution liquid is in the range of 120° C. to 200° C. to produce a mixture of microcrystalline cellulose and hydrolysate, and flashing the mixture as the mixture is discharged from the reactor after the acid hydrolysis, wherein the flashing reduces the pressure and temperature of the mixture and generates flash steam,
   e) after the flashing, separating the mixture to separate the microcrystalline cellulose from the hydrolysate, and washing the separated microcrystalline cellulose in at least one washing apparatus,
   f) increasing a consistency of the separated and washed microcrystalline cellulose by thickening, and
   g) conveying the first filtrate through a line to a chemical pulp mill.

2. The method according to claim 1, wherein the dilution liquid in step b) comprises a weak hydrolysate from the washing of microcrystalline cellulose, and/or condensate from a heat recovery system of the MCC plant.

3. The method of claim 1, wherein the flash steam from step e) is led to a condenser so that condensate is formed which is used to form at least part of the dilution liquid in step b).

4. The method of claim 1, wherein the MCC plant is integrated with pulp production of a pulp mill.

5. The method of claim 4, wherein the first filtrate is used in pulp treatment in the chemical pulp mill.

6. The method of claim 4, wherein acid hydrolysate and/or acid filtrates from step f) are used in a prehydrolysis kraft pulp production, in an acid stage of pulp bleaching or at a tall oil plant of the pulp mill.

7. The method of claim 1, wherein the temperature in the hydrolysis in step d) is in a range of 120° C. to 185° C.

8. The method of claim 1, wherein step of thickening the suspension of cellulosic material includes increasing a consistency of the suspension to within a range of forty to fifty percent.

9. The method of claim 1, wherein the step of increasing the consistency of the separated microcrystalline cellulose includes thickening and drying the separated microcrystalline cellulose to have a dry content of at least 93 percent.

10. The method of claim 1, wherein the step of separating includes diluting the mixture with a weak hydrolysate recovered from the washing of the separated microcrystalline cellulose before the separation of the microcrystalline cellulose from the hydrolysate.

11. A method to produce microcrystalline cellulose from fibrous cellulosic material comprising:
   thickening a suspension of cellulosic material by removing a first filtrate from the cellulosic material;
   adding a dilution liquid to the thickened suspension of cellulosic material to reduce a consistency of the thickened suspension of cellulosic material to a consistency in a range of five to forty percent;
   adding an acid to the thickened suspension with the dilution liquid such that a pH is no greater than four of the thickened suspension with the dilution liquid;
   heating the thickened suspension with the dilution liquid in a reactor to a temperature in a range of 120° C. to 200° C. to subject the thickened suspension with the dilution liquid to acid hydrolysis to produce a mixture of microcrystalline cellulose and hydrolysate and flashing the mixture by discharging the mixture from the reactor after the acid hydrolysis, wherein the flashing reduces a pressure and temperature of the mixture;
   separating microcrystalline cellulose and hydrolysate in the flashed mixture;
   washing the separated microcrystalline cellulose,
   thickening the separated microcrystalline cellulose, and
   conveying the first filtrate through a line to a chemical pulp mill.

12. The method of claim 11, wherein the addition of the dilution liquid is added in a dilution screw and the method further comprises pumping with a pump the thickened suspension with the dilution screw to the reactor, wherein the addition of the acid is performed in or downstream of the pump.

13. The method of claim 1, wherein step b) is performed by first adding the dilution liquid to the thickened suspension of cellulosic material and subsequently adding the acid to the thickened suspension with the dilution liquid.

14. The method of claim 11, wherein the step of adding the acid to the thickened suspension with the dilution liquid achieves a pH of 2 to 3 of the thickened suspension with the dilution liquid.

15. The method of claim 1, wherein the step of adding the acid to the thickened suspension with the dilution liquid achieves a pH of 2 to 3 of the thickened suspension with the dilution liquid.

16. The method of claim 1, wherein the microcrystalline cellulose does not have a substantial carbonyl content.

17. The method of claim 11, wherein the microcrystalline cellulose does not have a substantial carbonyl content.

* * * * *